United States Patent
Mahlab et al.

(10) Patent No.: US 7,457,354 B2
(45) Date of Patent: Nov. 25, 2008

(54) METHOD AND DEVICE OF ANALYZING A SIGNAL TRANSMITTED VIA A COMMUNICATION LINK

(75) Inventors: Uri Mahlab, Or-Yehuda (IL); Avi Levy, Ramat Gan (IL)

(73) Assignee: ECI Telecom Ltd., Petach-Tikva (IL)

( * ) Notice: Subject to any disclaimer, the term of this patent is extended or adjusted under 35 U.S.C. 154(b) by 762 days.

(21) Appl. No.: 10/940,816

(22) Filed: Sep. 15, 2004

(65) Prior Publication Data

US 2005/0063497 A1    Mar. 24, 2005

(30) Foreign Application Priority Data

Sep. 18, 2003    (IL)    ........................ 157985

(51) Int. Cl.
*H04B 3/46*    (2006.01)
(52) U.S. Cl. ................... 375/225; 375/224; 398/20; 398/38
(58) Field of Classification Search .............. 714/704; 385/17, 140; 398/38, 20; 375/224, 25
See application file for complete search history.

(56) References Cited

U.S. PATENT DOCUMENTS

| | | | |
|---|---|---|---|
| 5,831,731 A | 11/1998 | Hall et al. | |
| 6,072,601 A | 6/2000 | Toyohara | |
| 6,477,291 B1 * | 11/2002 | Ramadas | 385/17 |
| 6,501,573 B1 | 12/2002 | Lee et al. | |
| 6,570,682 B2 * | 5/2003 | Robinson et al. | 398/20 |
| 6,583,903 B1 | 6/2003 | Way et al. | |
| 6,606,354 B1 | 8/2003 | Bach et al. | |
| 2003/0191990 A1 * | 10/2003 | Reynolds et al. | 714/704 |
| 2004/0109661 A1 * | 6/2004 | Bierman et al. | 385/140 |
| 2005/0019032 A1 * | 1/2005 | Scarth et al. | 398/38 |

FOREIGN PATENT DOCUMENTS

EP    0 903 874 A2    3/1999

(Continued)

OTHER PUBLICATIONS

In-Service Optical Performance Monitoring of High-Speed Transparent Networks Based on Q Measurements; Proceedings of 3rd Conference on Transparent Optical Networks; 2001; pp. 210-217.*

(Continued)

*Primary Examiner*—Chieh M. Fan
*Assistant Examiner*—Sudhanshu C. Pathak
(74) *Attorney, Agent, or Firm*—Browdy and Neimark, P.L.L.C.

(57) ABSTRACT

Technology is proposed for estimating one or more characteristics of a main signal transmitted via a communication link, wherein the main signal is composed from a number of component signals possibly comprising respective data signals and transmitted via a number of respective communication channels. The technology comprises providing an analyzing circuit independent from the communication link, transmitting a probe data signal in the analyzing circuit, monitoring a bit error rate (BER) parameter associated with the probe data signal and introducing into the analyzing circuit at least a portion of energy of the main signal as an interference signal. The technology allows judging about characteristics of the main signal based on changes in the monitored BER parameter of the probe data signal.

34 Claims, 6 Drawing Sheets

FOREIGN PATENT DOCUMENTS

EP          1 326 362 A1    7/2003

OTHER PUBLICATIONS

"Rapid Testing of Extremely Low BER". http://ftp.agilent.com/pub/semiconductor/morpheus/docs/low_ber.pdf, Optical Network Interface Design Symposium; Galloway et al.; 2001; pp. 4-1-to-4-16.*

Standardization of the Q-factor Method; R.Bach; Nov. 2003; pp. 1-6.*

All-Semiconductor 1310-nm 90-Gbit/s WDM Transmission for LAN/MAN Applications; Khoe et al.; 2002; pp. 1-2.*

Palacharla, P., et al., "Techniques for Accelerated Measurements of Low Bit Error Rates In Computer Data Links", Computers and Communications, 1995, Conference Proceedings of the 1995 IEEE Fourteenth Annual International Phoenix Conference on Scottsdale, AZ, USA Mar. 28-31, 1995, New York, NY, USA, IEEE, US, Mar. 28, 1995, pp. 184-190, XP010149389, ISBN: 0-7803-2492-7.

Zhou, Jianying, et al., "Measurements of Very Low Bit-Error Rates of Optical Switches Based on Semiconductor Optical Amplifiers", IEEE Photonics Technology Letters, IEEE INC. New York, US, Aug. 1997, pp. 1131-1133, vol. 9, No. 8, XP002200792, ISSN: 1041-1135.

* cited by examiner

METHOD AND DEVICE OF ANALYZING A SIGNAL TRANSMITTED VIA A COMMUNICATION LINK

FIELD OF THE INVENTION

The invention relates to the field of telecommunication, preferably to data communication in optical networks.

BACKGROUND OF THE INVENTION

There are various methods and devices, known in the prior art, for monitoring and analyzing a signal transmitted via a communication link, in order to measure or estimate various parameters of transmitted signals which could be of interest to those performing diagnostics and maintenance of communication networks.

Some of such methods allow determining presence and/or quality (often indicated as Q) of a digital data signal transmitted via a communication line. Needless to say, that knowledge about the presence and quality of data signals is highly important for operation of communication systems, especially of multi-channel ones. Modem multi-channel communication systems include optical, wired and also wireless systems.

Conventional methods monitor quality of an optical/non-optical signal solely by the intensity of the signal.

Another widely known method for determining quality of a digital data signal is by measuring its so-called bit error rate (BER).

U.S. Pat. No. 6,570,682 describes a method performing fault management in an optical communications system including a polarization mode dispersion (PMD) compensator. The method and apparatus utilizes a controller receiving notifications indicative of PMD in the system, as well as at least one indicator from a system device providing an indication of an attribute of the communication system. Such system devices include a receiver providing a Q (quality) factor and a bit error rate (BER) of an optical signal, and a signal-to-noise ratio meter providing an SNR of the optical signal. The method intelligently provides fault management by correlating the PMD notifications and system indicators to distinguish between fiber failure, PMD-related degradations, and failure of monitoring equipment itself.

U.S. Pat. No. 6,583,903 describes an optical data communications link where a modulated optical signal is emitted from an optical transmitter, coupled into one end of an optical fiber, and received by an optical receiver at the opposite end of the fiber. The U.S. Pat. No. 6,583,903 relates to reducing the polarization-mode dispersion (PMD) of the modulated optical signal, which tends to limit the usable bandwidth of the fiber. A polarization controller is applied to the modulated optical signal substantially near the transmitter. The receiver measures the quality of the received signal and issues commands to the polarization controller to improve the received signal quality. In various embodiments, the signal quality measurement may be based on observed bit-error-rate (BER), estimated best attainable BER, or estimates of PMD affecting the received signal. Such measurements may be performed in the receiver by altering the threshold level and sampling timing of a bit detector in the receiver and monitoring the resulting changes in BER.

It should be noted that modem communication networks are characterized by high transmission rates, and the trend is to increase the transmission rates more and more. Due to that, any equipment in such networks (and the measurement equipment in particular) is quite expensive and will become even more expensive.

One attempt to provide a cheap data quality measuring device for high bit rate signals is provided in the U.S. Pat. No. 6,501,573. The patent concerns an apparatus and a method for monitoring qualities of an optical signal. The apparatus is arranged for extracting the clock component of data from the optical signal transmitted and measuring the magnitude and then detecting the presence or absence of the signal and the error rate upon receiving the deteriorated signal due to the chromatic dispersion. The simple measuring apparatus has an optical coupler, a signal conversion means, a narrow optical detector, a super high frequency rectifier and a voltage detector. Still, the measuring circuit is a bit rate dependent circuit and is integrated in the data transmitter & receiver.

Similarly to the latter patent, U.S. Pat. No. 6,606,354 provides measurements of quality of a signal having a high bit rate, which is quite complex and expensive.

Yet another kind of methods provides monitoring and analyzing a signal composed from a number of communication channels, in order to estimate the number of channels presently active in the composite signal. Exact solutions of this task usually comprise expensive equipment such as a spectral analyzer or a plurality of precise filters.

U.S. Pat. No. 6,072,601 describes an optical fiber amplifier capable of determining a number of optical channels actually inputted to it, thereby allowing, through self-control, both optimum operation conditions in accordance with the number of transmission channels, and the maintenance of the transmission performance. The optical fiber amplifier comprises an optical signal amplifier and a control circuit. The control circuit section comprises a branch circuit that branches off and extracts a portion of the transmitted optical signal power, and a channel counter that inputs a portion of the branched optical signal power and based on that counts the number of channels of the transmitted optical signals.

However, channel counters, especially for high frequency/high bit rate systems, are quite expensive. This applies not only to optical, but to any wired or wireless communication systems.

SUMMARY OF THE INVENTION

There is still a need in a relatively simple and inexpensive technique for determining various characteristics of transmission, for example for estimating a number of data carrying channels in a multi-channel signal, for detecting a data signal and determining quality of the data signal transmitted via a communication channel.

To this end and according to a first aspect of the invention, there is provided a method of analyzing a signal transmitted via a communication link for estimating at least one characteristics of said signal, wherein the signal, being called a main signal, is composed from one or more component signals possibly comprising respective data signals and transmitted via one or more respective communication channels, the method comprising:

providing an analyzing circuit independent from said communication link, transmitting a probe data signal in the analyzing circuit, monitoring a BER (bit error rate) parameter of the probe data signal;

obtaining at least a portion of energy of the main signal from a particular point of said communication link, introducing said portion of energy, as an interfering signal, into said analyzing circuit;

judging about said one or more characteristics of the main signal at said particular point of the communication link, based at least on changes in the monitored BER parameter of the probe data signal due to the interfering signal.

The above method can be used for estimating a number of characteristics of the main signal, for example:
- a number of communication channels carrying data (a number of data channels),
- presence of a data signal in a particular communication channel,
- quality of the data signal in the particular channel.

According to one version of the method, the main signal to be analyzed is one component signal conveyed via a particular communication channel; the method is suitable for detecting presence of a data signal (so-called main data signal) in said particular communication channel and/or estimating quality of the main data signal, in the method, the main data signal has a first bit rate, said probe data signal has a second bit rate.

Both the main data signal and the probe data signal can be propagated either by themselves, or carried by respective carrier signals. Likewise, the main data signal can be digital or analog.

It should be noted that in the most preferred version of the method, the second bit rate is lower than the first bit rate, thereby equipment of the analyzing circuit (comprising measuring BER of the probe data signal affected by the interfering signal) is much less expensive then it would be in a case of equal bit rates or in a case of direct measurement of BER of the main data signal.

In other words, the proposed method enables detecting presence/quality of the data signal without extracting it from its carrier signal, i.e., without demodulation and detection. The proposed method allows doing that by a non traffic-affecting way (in particular, by using a portion of the main signal) and inexpensively, just by detecting changes in an interfering signal introduced into a low bit rate analyzing circuit.

The main concept of the method can be used as is for detecting presence of the main data signal, just by registering changes of the BER parameter, since, as has been found by the Inventors, the analyzing circuit is naturally calibrated to have a lower BER at the state of absence of interfering signal, as well in case of absence of the main data signal in the interfering signal.

However, the method may comprise a specific preliminary step of calibrating the analyzing circuit to provide, say, a BER reference value (for example, $10^{-12}$ for optical networks, $10^{-5}$ to $10^{-9}$ for other known network) at the absence of the main data signal in the communication channel.

Preferably, a ratio between values of the probe data signal and the interfering signal (so-called interference ratio IR) is to be known at the calibration.

In any version, the method preferably comprises an additional step of measuring or monitoring the IR parameter.

Then, to determine presence of the main data signal in the communication link, the method may comprise obtaining at least one combination of readings of the BER parameter and the IR parameter, and, at the step of judging, comparing said combination of readings with said reference value of the BER parameter and its corresponding IR value preliminarily obtained for a state when the main data signal is absent in the communication channel (i.e., at the calibration).

A conclusion can be made that the method should preferably comprise preliminarily building at least one database reflecting relationship between the parameters BER and IR and enabling making decisions upon obtaining a particular combination of said readings.

Another way of detecting the presence of the main data signal, which also allows estimating the quality of the main data signal, includes measuring the IR parameter, but the step of judging comprises using a preliminarily built database reflecting relationship between the parameters BER, IR and an additional parameter characterizing quality of the main data signal.

This additional parameter characterizing quality of the main data signal can be, for example, its extinction ratio (ER) parameter which indicates a specific relationship between values of a logical "1" and a logical "0".

It should be noted, that if the task is just to determine extinction ratio ER of the main data signal, the method directly allows doing it (since ER is one of quality parameters of a data signal). Therefore, the proposed method is also a method of determining ER of the main digital data signal, allowing further control of the signal quality.

According to another version of the method, it is suitable for estimating a number of data carrying communication channels in the main signal, when said main signal is composed from a plurality of component signals respectively carried by a plurality of communication channels.

For estimating the number of data carrying communication channels in the main signal, the method comprises measuring the IR parameter, and, at the step of judging, further comprises using a preliminarily built data base reflecting relationship between the parameters BER, IR, and a number of data channels.

It is understood, that if all communication channels to be checked are a priori data channels, the method will estimate just the number of channels.

The method is most advantageous for modem optical communication links. However, it is suitable for analyzing signals in communication links belonging to other network types, for example conventional and modem networks transmitting various electric signals, wireless networks.

From the point of performing the method, the following various combinations and order of operations are pointed out below.

In the preferred version of the method, it comprises the following additional step:

obtaining, at the analyzing circuit, in addition to one or more readings of the BER parameter, also one or more readings of an interference (IR) parameter, wherein said IR parameter being a ratio between values of the probe data signal and the interfering signal, wherein the judging about at least one said characteristics is performed based on at least one combination of the obtained readings of said two parameters BER and IR.

In a further version of the method, the step of obtaining the readings comprises measuring, in the analyzing circuit, one of the two parameters BER or IR, while maintaining the other one of said two parameters constant; and the step of judging comprises judging about at least one said characteristics based on a value of the parameter measured in said analyzing circuit.

Actually, for performing the step of judging, the method preferably comprises utilizing at least one preliminarily built database reflecting relationship between values of said two parameters BER and IR.

Preferably, said at least one preliminarily built data base reflects relationship between values of said two parameters BER and IR and at least one additional parameter, said additional parameter characterizing either a number of data channels (such as NOC or NODC), or quality of the main data signal (such as Extinction Ratio ER).

In one particular version, the above-described method can be utilized for detecting a fact of existing more than one data channels in the main signal. For example, it can be useful if the main signal is an output signal of a filter or a dropped signal of an optical add drop multiplexer (OADM). If such a fact is detected, the method may further include a step of adjusting the main signal to comprise only a single component signal transmitted via a single predetermined communication channel.

The step of adjusting the main signal may be performed, for example, by tuning the filter (i.e., a stand-alone filter or a drop filter of an OADM).

However, the step of the main signal's adjustment can be performed differently, for example by tuning a suitable laser in the transmitter of the predetermined communication channel.

Detection of existence of more than one data channels in the main signal, being an output of a filter or OADM, can be performed as described above for estimating the number of data carrying communication channels.

According to a second aspect of the invention, there is also provided an apparatus for analyzing a signal transmitted via a communication link for estimating at least one characteristics of said signal, wherein the signal, being called a main signal, is composed from one or more component signals possibly comprising respective data signals and transmitted via one or more respective communication channels, the apparatus comprising:

an analyzing circuit comprising a generator of a probe data signal for transmitting it in said circuit, and a BER tester for monitoring a BER (bit error rate) parameter of the probe data signal, the analyzing circuit being independent from said communication link;

a coupling means for introducing at least a portion of energy of the main signal into the analyzing circuit, as an interfering signal;

the apparatus enabling judgment about said one or more characteristics of the main signal based at least on changes in the monitored BER parameter of the probe data signal due to said interfering signal if introduced.

Preferably, the apparatus comprises a control and processing unit being in communication with the BER tester and being capable of performing said judgment.

Also, the apparatus may further comprise:

a means for regulating and/or measuring a ratio between values of the probe data signal and the interfering signal being called an interference ratio (IR) parameter;

the apparatus being thus capable of judging about at least one said transmission characteristics, based on a combination of readings of said parameters obtained, for example if said control and processing unit is in communication with said regulating means to obtain readings of the two parameters BER or IR.

The means for regulating/measuring may comprise, for example, a power regulation for a generator of the probe data signal, at least one controllable attenuator or controllable amplifier, and/or at least one photodiode for measuring optical energy of a signal (for the case of optical probe data signals and/or optical main signal).

Further preferably, the control and processing unit comprises a memory storing at least one preliminarily built database reflecting relationship between values of said two parameters BER and IR, the database being utilized for the judgment.

Most preferably, that said at least one database reflects relationship between values of said two parameters BER and IR and at least one additional parameter, said additional parameter characterizing either a number of data channels (such as NOC, or more exact—NODC), or quality of the main data signal (such as Extinction Ratio ER).

In practice, the control and processing unit may be enabled to organize measurement of one of the two parameters BER or IR, while maintaining the other one of said two parameters constant; the control and processing unit thereby judging about at least one said transmission characteristics, based on the value of the parameter measured in said analyzing circuit.

The apparatus is adapted for sampling said main signal from any point of the communication link and further regulating the sampled signal for introducing it as the interfering signal. The regulation can be performed, for example, by a controlled attenuator, amplifier, timing device etc., associated with the coupling means.

The apparatus is suitable for estimating one or more of said characteristics of the main signal, at least such as a number of communication channels carrying data, presence of a data signal in a particular communication channel, quality of said data signal. Actually, the function of the apparatus depends on selecting a suitable database and a corresponding processing program.

In one particular embodiment, the apparatus is adapted for estimating a number of communication data channels in the signal, when said signal is composed from a plurality of component signals respectively carried by a plurality of communication channels.

In one particular embodiment, the apparatus can be adapted to monitoring a number of data channels in the main signal, and to produce an indication whenever more than one data channels are detected in the main signal. (Preferably, the main signal is an output signal of a filter or a dropped signal of an OADM). The apparatus can further be provided with a feedback circuit which, when more than one data channels are detected in the main signal, is adapted to cause tuning (adjusting) of the main signal in response to the indication, to make the main signal comprise one single component signal transmitted via a single predetermined communication channel.

The tuning of the main signal can be performed, for example, by tuning the filter (i.e., a stand-alone filter or an OADM drop filter). Alternatively, the tuning of the main signal can be achieved by adjusting a suitable laser of the single predetermined communication channel. Monitoring of a number of data channels in the main signal can be performed, for example, as described above for estimating the number of data carrying communication channels.

Alternatively, or in addition, the apparatus can be adapted for detecting presence of a main data signal in a signal transmitted via a particular communication channel.

Specifically, or in addition to other functions of the apparatus, it can be adapted for determining quality and/or extinction ratio ER of the main data signal, according to the above-described method.

Actually and preferably, the structure of the module enables adjustment of its elements, such as of the coupling means, the regulation means, the probe data signal generator and BER tester, the control and processing unit for estimating one or more desired characteristics of the main signal.

The apparatus can be either a separate (and possibly portable) piece of equipment, for example either a card, or part of a network node (integral or optional) pre-manufactured to be activated whenever required, for performing the proposed method.

There is also proposed such a modified node or a network element (NE), equipped with the inventive apparatus.

According to yet a further aspect of the invention, there is proposed a system comprising at least one apparatus as above. The system may perform, for example, analysis of a multi-channel signal and/or of different channels thereof. In another example, a number of the apparatuses may analyze the signal at different points along one and the same link; in such a system the apparatuses may be in communication with a network manager capable of collecting information about the signal characteristics, and capable of producing conclusions based on the collected information. Other configurations of the system can be More details of the invention will become apparent as the description proceeds.

BRIEF DESCRIPTION OF THE DRAWINGS

The invention will further be described with reference to the following non-limiting drawings and examples, in which.

DETAILED DESCRIPTION OF THE INVENTION

Figure 1A:
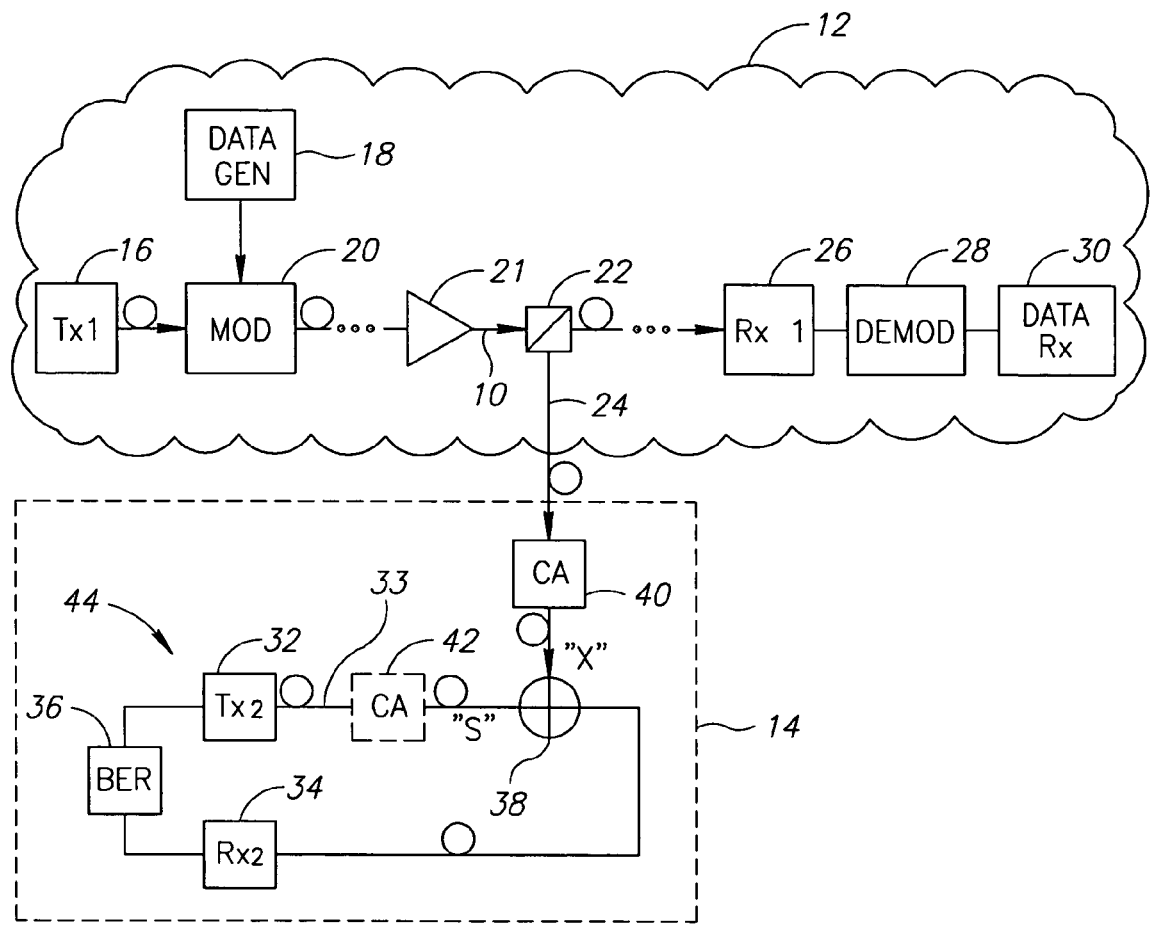
FIG. 1a illustrates a simplified block diagram illustrating the method according to the invention.

FIG. 1a schematically illustrates the concept of the invention. The concept applies to a communication link belonging to a network conducting either type of a signal: electrical, optical, radio signal. The link conveys a main signal which may comprise either a single channel, or a number of channels and thus the signal may comprise a number of multiplexed component signals. In this particular figure, a single channel communication link 10 is shown, belonging to a network 12. The signal transmitted over the link 10 can be formed by a carrier signal modulated by a so-called main data signal. To analyze the main signal in the communication link 10, the Inventors propose obtaining a split portion of the main signal, and using the split portion as a noise or interfering signal for a separate independent apparatus 14 which generates its independent probe data signal, transmits it through an internal circuit and measures its bit error rate (BER). The Inventors have found that changes in the BER of the probe data signal caused by the interfering signal are indicative of some characteristics of the main data signal. The probe data signal should preferably have its bit rate lower than the bit rate of the main data signal to be analyzed.

In this particular example, an optical carrier signal is transmitted via a link 10 of the optical network 12 by a first transmitter Tx1 marked 16, the main data signal may be (and may be not) transmitted by a data generator 18 The carrier signal is modulated with the main data signal by a modulator 20. (To be noted, that the main data signal can be transmitted by a different equipment, and even without any carrier.) In this example, the modulated signal can be amplified by an optical amplifier 21, and is further split by a splitter 22 at a point of the link to be analyzed. A smaller portion of the signal energy is fed to the apparatus 14 as an interfering signal 24. The major part of the signal's energy is finally received and demodulated by a receiver 26, a demodulator 28 and a data receiver 30, so the splitting does not effect the traffic.

The apparatus 14 comprises a transmitter Tx2 (32) of a known probe data signal 33, a receiver Rx2 (34) and a tester block 36 for measuring (monitoring) BER of the signal transmitted in the analyzing circuit 44. The interfering signal 24 is fed to a coupler 38 which combines the probe data signal with the interfering signal, and the combined signal is fed (directly or indirectly) to the Rx 34 and then to the BER monitoring block 36. For obtaining/maintaining the desired ratio between powers of the probe data signal and the interfering signal fed to the coupler 38, at least one controllable attenuator or amplifier 40 (and/or 42) can be inserted in the respective lines.

Figure 1B:
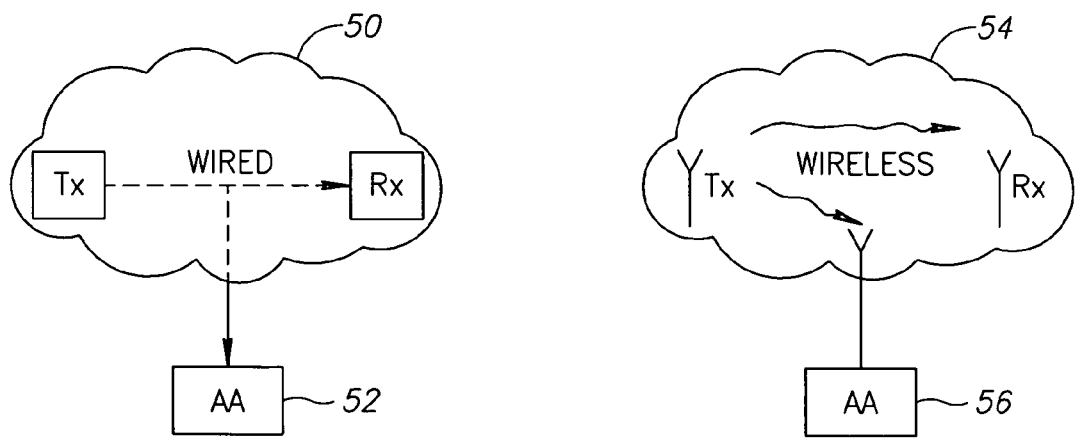
FIG. 1b illustrates some other possible networks, links of which can be monitored using the proposed method.

FIG. 1b illustrates that signals transmitted via communication links in different networks: 50 (various wired network such as a conventional telephone network, IP, ATM, ADSL, etc) and 54 (wireless network) can be analyzed based on the same inventive concept, using analyzing apparatuses 52, 56 similar to the apparatus 14 shown in FIG. 1a.

Figure 1C:
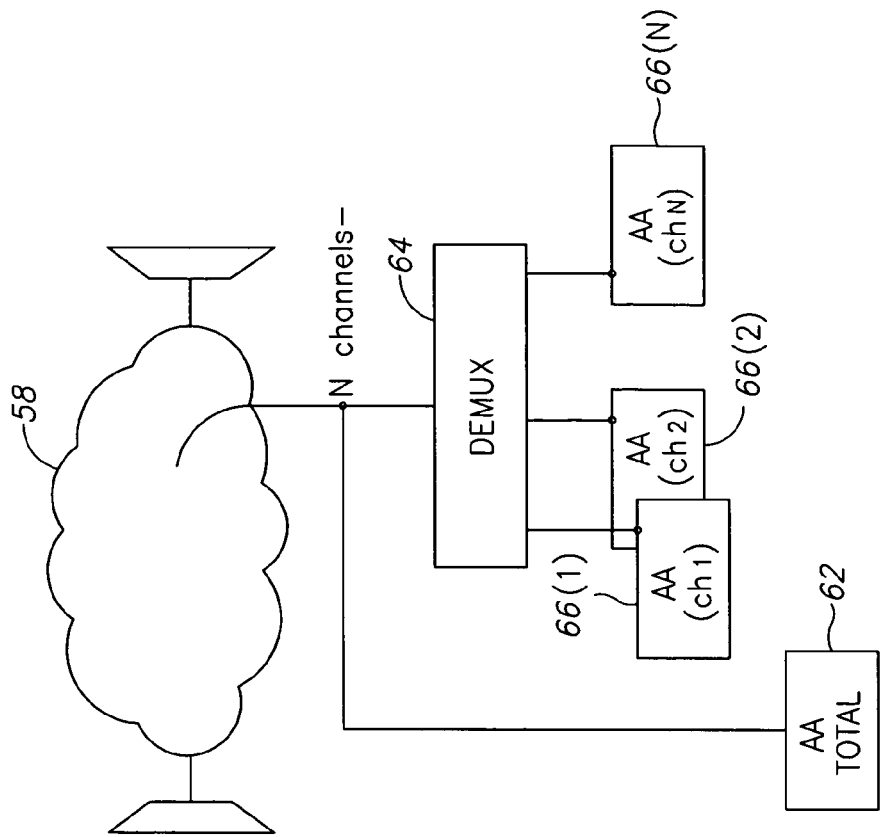
FIG. 1c illustrates some possibilities of analyzing multi-channel signals and single-channel signals by the device according to the invention
Figure 1C:
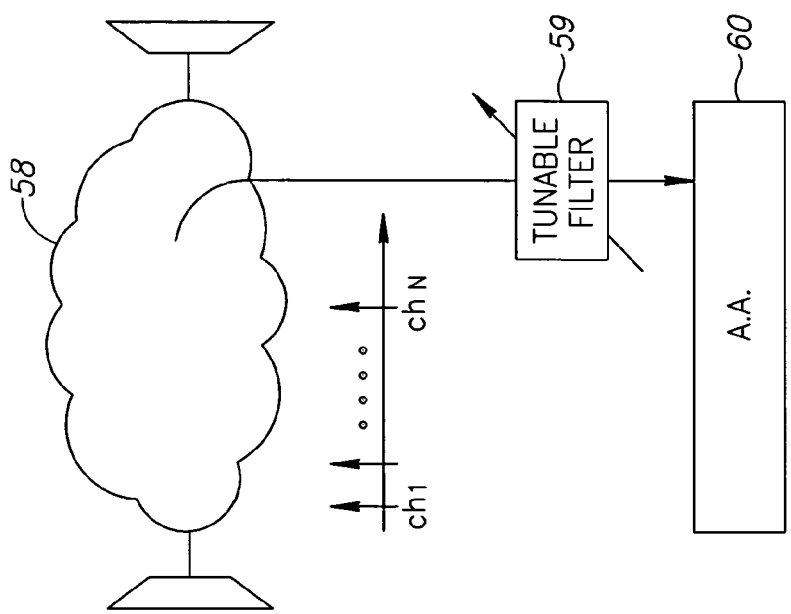

FIG. 1c illustrates how the inventive principle can be applied for analyzing multiple channel signals. For example, the main signal is sampled from a multi-channel communication link belonging to a network 58. The sampled signal comprising a number of carrier frequencies of different channels can be filtered by a tunable filter 59, so that the analyzing apparatus 60 similar to that shown in FIGS. 1a and 1b, receives, as its interfering signal, only one filtered component signal transmitted in a particular channel selected by the filter. By tuning the filter 59, signals of different channels may be fed to the analyzing module in sequence. If the filter is absent or tuned to pass all the bandwidth, the apparatus 60 will analyze the multi-channel signal (for example, as proposed in FIG. 4).

Alternatively, the multi-channel signal and at least some of its "n" component single-channel signals can be analyzed by utilizing a demultiplexer 64 and a number of analyzing modules 62 and 66(1)-66(n).

Figure 2:
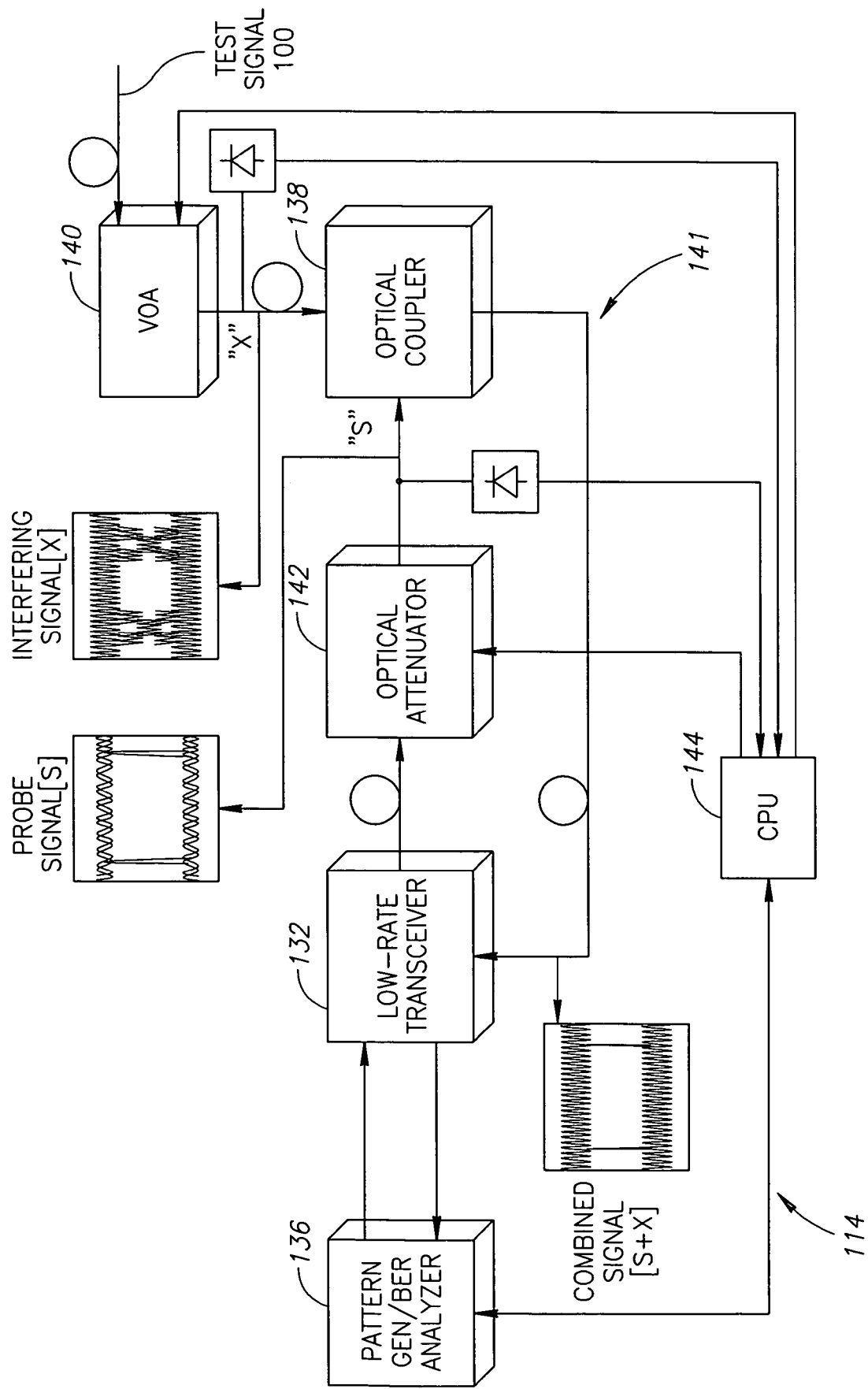
FIG. 2 is a more detailed block diagram illustrating one embodiment of the signal analyzing device according to the invention.

FIG. 2 illustrates a more detailed embodiment 114 of the apparatus 14 shown in FIG. 1, for the case of analyzing an optical signal transmitted via a communication channel and carrying a high bit rate main data signal.

The device 114 receives a test signal 100 being a tapped (split) portion of the optical signal to be analyzed. Depending on a specific implementation, the test signal may comprise only a portion of the main data signal, or the portion of the carrier modulated by the main data signal. The test signal is introduced in the device 114 via a block 140 comprising a controllable optical attenuator or amplifier (Variable Optical Attenuator is shown) and a photo detector, such as a photo-diode. The photodiode is used for measuring the attenuated test signal, which is now called an interfering signal "X". The interfering signal "X" is introduced into an analyzing circuit 141 via an optical coupler 138. The analyzing circuit 141 comprises a low bit rate transceiver 132 generating an optical probe signal "S" (being a predetermined digital pattern) which is transmitted in the circuit and further analyzed from the point of BER, by means of the block 136. The probe data signal is passed via an optional attenuation block 142, and its power is measured by the associated photo detector.

If the device 114 is adapted for detecting presence of a main data signal in the test signal 100, it can preliminarily be calibrated so that in the absence of the main data signal in the test signal 100, BER of the combined signal in the analyzing circuit is minimal.

It should be noted that both the main data signal and the probe data signal may, in principle, be transmitted without respective carrier signals.

The BER analyzer (tester) of the block 136 is capable of performing measurements sufficient for making a simplest decision about characteristics of the main data signal (say, for detecting the presence of the main data signal when the analyzing circuit is calibrated). The BER analyzer 136 enables sensing the changes in BER when the interfering signal is introduced in the circuit 141. A control and processing block in this case may be understood as part of the BER analyzer, to provide any indication whenever the changes are registered. A more developed control and processing block is marked 144, and is capable of controlling the monitoring/measurement process in the analyzing circuit for obtaining two values of respective parameters BER and IR; a combination of the obtained values will be indicative of at least one characteristics of the main data signal. For obtaining the IR parameter, blocks 140 and 142 comprise photo detectors (say, photo diodes) which enable obtaining real time readings of the intensity of the signals to be further transferred into the ratio IR. Alternatively or in addition, the IR parameter may be regulated by regulating power of the probe data signal generator 136.

For detecting the presence of data signal in the test signal 100, the following operations can be performed in the analyzing circuit upon the interfering signal is introduced:

measuring either BER or IR parameter in the detecting circuit, with the following conditions:
a) measuring BER (bit error rate) of the probe data signal, while maintaining IR (the interference ratio) constant,
b) measuring IR (interference ratio), while maintaining BER (bit error rate) of the probe data signal constant,
judging about presence of the main data signal in the test signal, based on a value of the parameter measured in the analyzing circuit.

To judge on the presence of the main data signal in the test signal based on such combinations of the values BER and IR, the control and processing unit must use database which stores various combinations, including those characterizing the calibrated circuit (the circuit at the absence of the main data signal in the interfering signal, and with a particular IR value).

The way of judgment on the same and other signal characteristics using databases will further be illustrated with the aid of the following figures.

Figure 3:
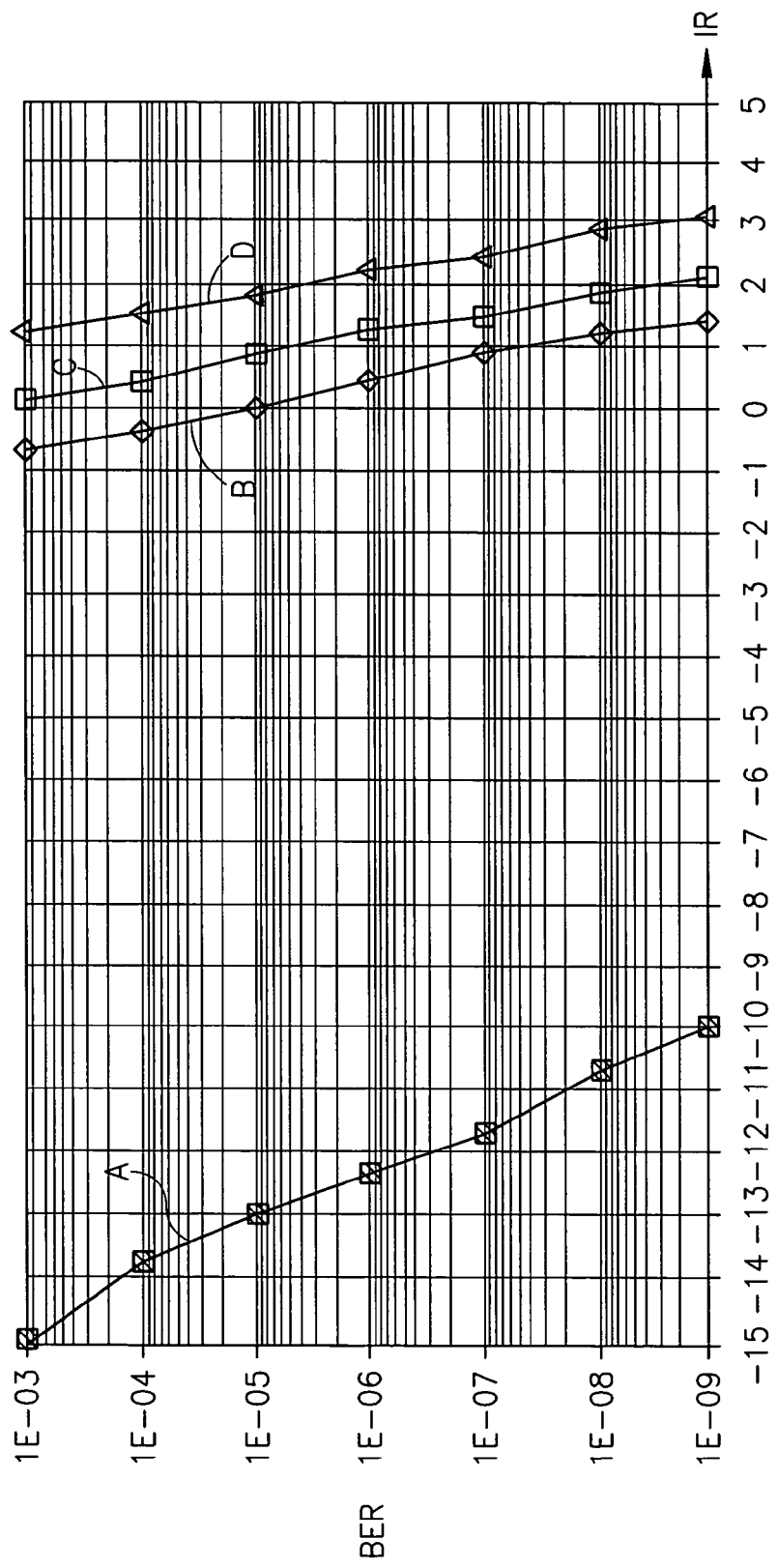
FIG. 3 illustrates an empirically obtained graphic representation of BER values in the analyzing circuit versus the interference ratio (IR) value in the analyzing circuit, for various extinction ratios of the main data signal.

FIG. 3 graphically illustrates an exemplary data base for estimating the presence of data in the main signal to be analyzed, and for estimating quality of the data signal. It illustrates the BER parameter values of the combined signal (probe signal+interfering signal) in the analyzing circuit versus the interference ratio IR (expressed as S/X[dB]), for different values of extinction ratio ER of the main data signal (indicated in the upper portion of the drawing). The BER is presented in measurement units 1E-0n being equal to one error bit out of $10^n$ transmitted bits, or BER=$10^{-n}$.

All the curves were obtained experimentally for the main data signal having bit rate of 2.5 Gb/s, carried by an optical carrier of about 1550 nm. In the analyzing circuit, the probe data signal had the bit rate 155 Mb/s, the carrier was also of about 1550 nm, the data pattern used was so-called NRZ PRBS $2^{23-1}$. All the transmitters were DFB (Distributed Feedback) lasers.

The single left curve A illustrates the dependence BER/IR for the data signal ER=0, i.e. for the practical absence of the data signal. The group of curves B,C,D in the right portion of the drawing show the dependence character at three real values of ER. Conclusions which can be made based on the drawing are as follows: when measuring BER and IR and obtaining a combination of the readings, one may judge not only about the presence of the data signal (i.e., due to location in the left or right portion of the graph), but also about its quality (i.e., owing to location on a particular curve). In other words, to estimate the presence of the main data signal and its quality, it is recommended to obtain a combination of the BER and IR readings and to use a preliminarily built database where a third additional parameter (the ER) is also taken into account. It is preferred to maintain a value of one of the BER or IR parameters constant, say IR (S/X) in the range 0-4 db, or BER in the range 1E-06, then measurements of the second parameter will readily indicate the characteristics of interest.

It is understood that the data base can be built differently, for example by reflecting BER values measured at the analyzing circuit versus extinction ratio ER of the main data signal, for at least one selected interference ratio IR.

It should be noted that ER degradation (ER penalty) depends on the quality of the main signal transmission ( blocks 16, 18, 20 in FIG. 1a) and on the accumulated noise in the link (say, due to ASE—amplified spontaneous emission of the amplifier 21, FIG. 1a).

By sampling a signal from a number of different points on the same link, one may obtain indication of the main signal degradation along the link.

Figure 4:
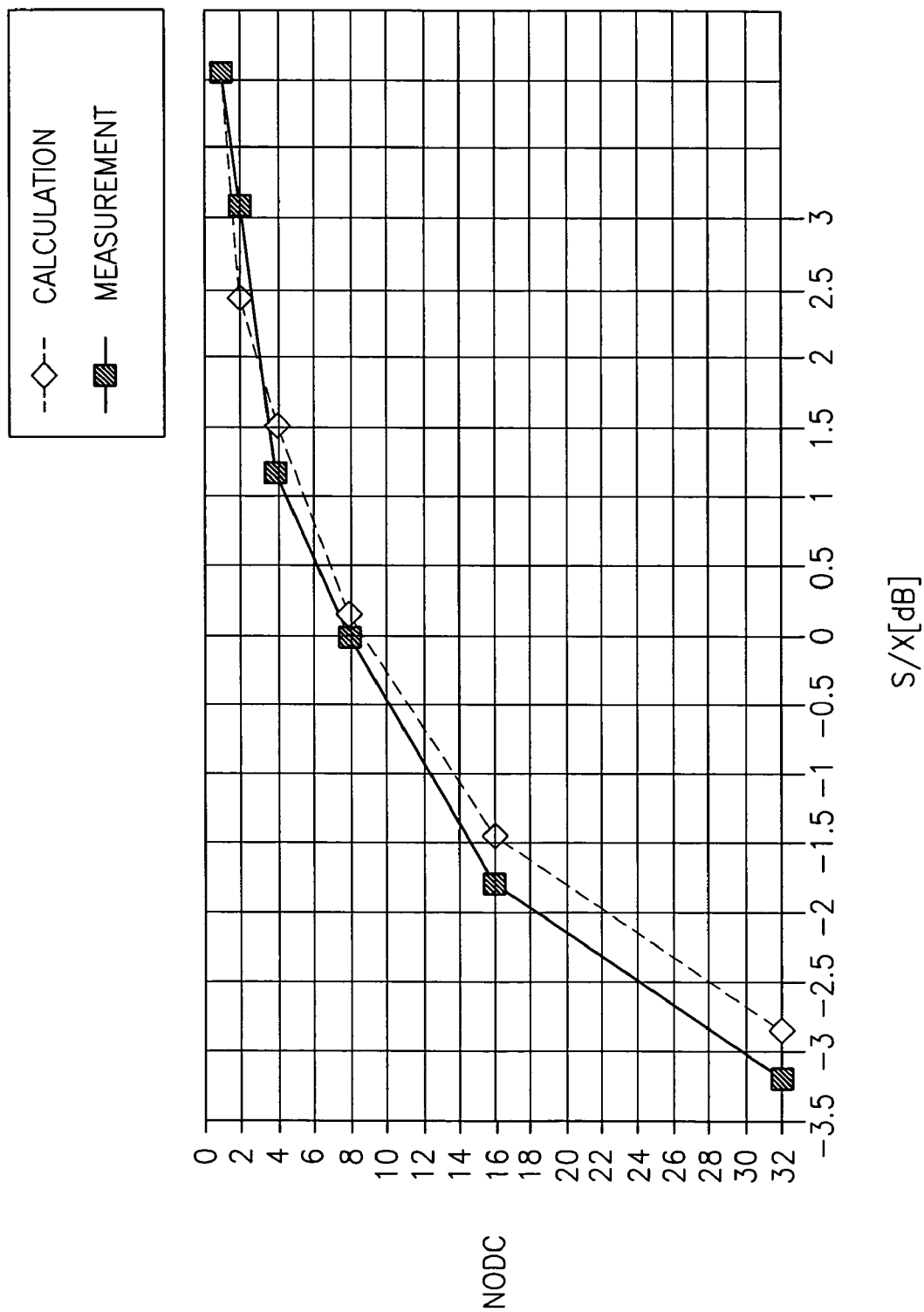
FIG. 4 graphically illustrates a dependence between interference ratio (IR) and a number of optical data channels (NODC) in the analyzed signal, empirically obtained for an optical communication link.

FIG. 4 illustrates a graphical representation of a database reflecting the interference ratio IR (S/X[db]) versus a number of data channels NODC in an optical main signal. The empiric measurements for building the table (i.e., this specific database) were performed for the constant BER value being BER=1E-6. Results of suitable calculation (shown by a dotted line) were obtained using a mathematical model; the calculated results and the empiric measurements mutually approve each other. One can see that, using such a database, a combination of readings of BER and IR in the analyzing circuit, when a required BER is maintained, allows estimating the number of data channels in the main optical signal with a particular extent of accuracy.

In the measurements used for building the graph of FIG. 4, DFB lasers were used for modulation the optical carriers, all transmitting in the C-band, in the range of 1529-1562 nm.

The graphs shown and described with reference to FIGS. 3, 4 can be used for building data bases in the proposed analyzing module, for processing the readings and making the decisions.

Figure 5:
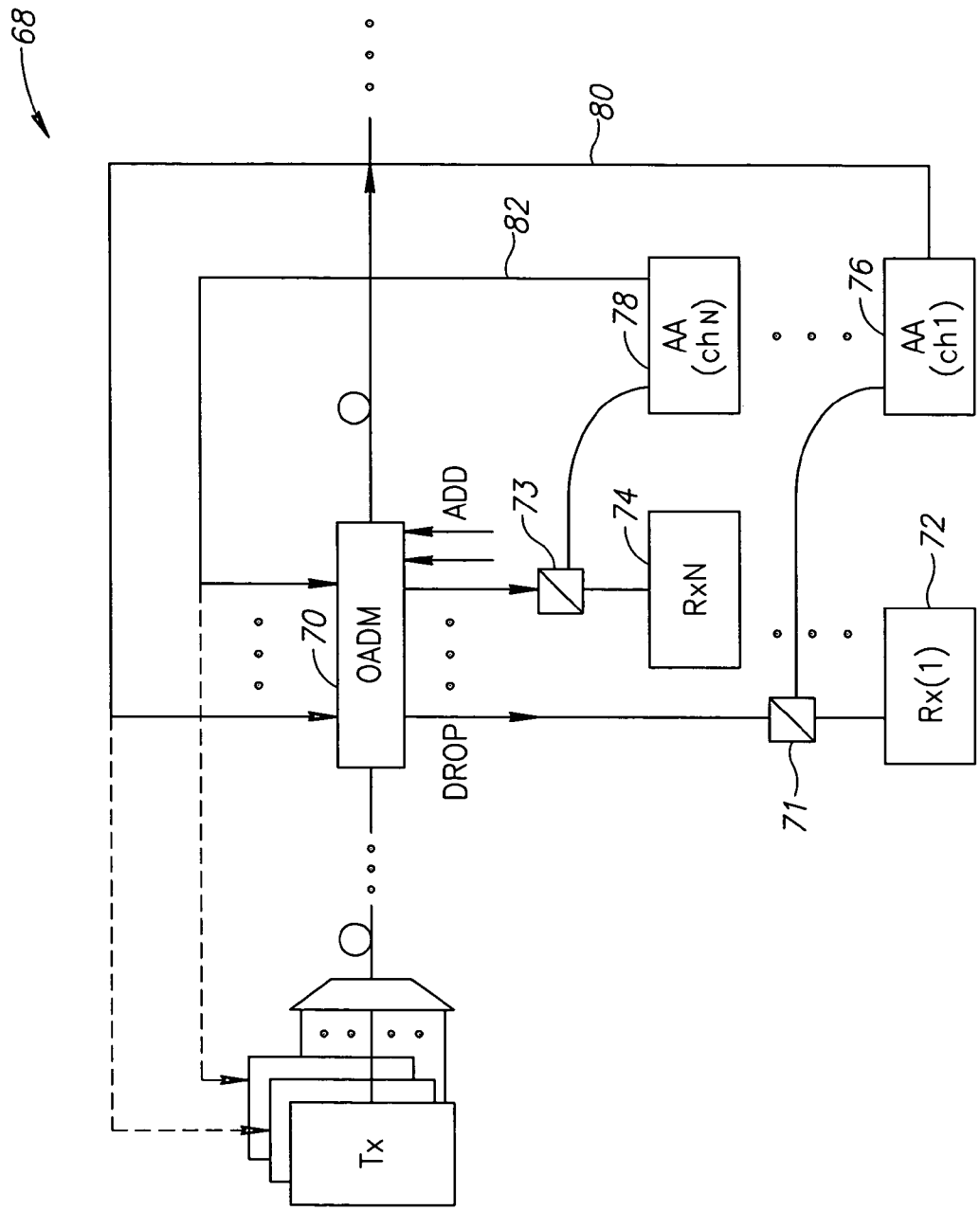
FIG. 5 illustrates the apparatus according to the invention, suitable for online monitoring and adjusting wavelength of communication channels.

FIG. 5 illustrates yet a further version of the method and an example 68 of a system where the apparatus for analyzing a communication signal can be used. The exemplary system comprises an optical add drop multiplexer OADM 70 receiving a multi-channel optical signal from a number of transmitters Tx. Let us suppose that all optical channels in that signal carry respective data. OADM drops optical channels Nos. 1 and N using its internal drop filters; the respective receivers Rx1 and RxN marked 72 and 74 then receive the channels. In this figure, each of the dropped signals is split by a splitter before the receiver, and the split portion of the signal is fed to a suitable analyzing apparatus (AA). However, the AA can be part of the suitable receiver and may analyze portion of the signal (or the whole signal) already inside the receiver. In this figure, a splitter 71 splits the dropped signal of data channel, and apparatus 76, for which data channel 1 signal is the so-called main signal, analyzes a portion of that signal. The analyzing apparatus 76 is adapted to estimate a number of data channels in the received signal portion and, in case that more than one data channel is detected, to issue an indication via a feedback line 80 that the suitable drop filter of the OADM should be adjusted. Various mechanisms of tuning/adjusting the channel in response to the indication can be used. The indication transmitted via the feedback line 80 can be utilized, for example: a) for tuning the suitable drop filter of OADM, b) for tuning a laser in the suitable channel transmitter Tx (see dotted continuations of the feedback lines). The latter can be implemented with participation of the network management. Such a method of tuning the laser can be used, for example, when OADM comprises static filters.

Operations similar to those described above can be carried out with respect to the dropped signal of the data channel N.

A system, similar to that shown in FIG. 5 with respect to one data channel (No. 1 or No. N), can be arranged for tuning a stand alone tunable filter used in a communication optical network.

It should be appreciated that other versions of the method and other embodiments of the device can be proposed in the frame of the invention concept defined by the claims that follow, and are to be considered part of the invention.

The invention claimed is:

1. A method for estimating one or more characteristics of a main signal to be analyzed transmitted via a communication link, wherein
said main signal is composed from one or more component signals possibly comprising respective data signals and transmitted via one or more respective communication channels,
the method comprises:
providing an analyzing circuit being separate and independent from said communication link,
transmitting an independent data signal in the analyzing circuit,
monitoring a bit error rate (BER) parameter associated with the independent data signal;
introducing into said analyzing circuit at least a portion of energy of the main signal derived from a particular point of said communication link, as an interfering signal;
judging about said one or more characteristics of the main signal at said particular point of the communication link, based at least on changes in the monitored BER parameter of the independent data signal.

2. The method according to claim 1, comprising the following additional step:
in addition to readings of the BER parameter during said monitoring, obtaining one or more corresponding readings of an interference ratio (IR) parameter being a ratio between values of the independent data signal and the interfering signal,
wherein the judging about at least one said characteristics is performed based on one or more combinations of the obtained readings of said two parameters BER and IR.

3. The method according to claim 2, wherein the step of obtaining the readings comprises measuring, in the analyzing circuit, one of the two parameters BER or IR, while maintaining the other one of said two parameters constant; and
the step of judging comprises judging about at least one said characteristics based on a value of the parameter measured in said analyzing circuit.

4. The method according to claim 1, wherein the step of judging comprises utilizing at least one preliminarily built database reflecting relationship between values the parameter BER and a parameter IR, wherein the IR parameter being a ratio between values of the independent data signal and the interfering signal.

5. The method according to claim 4, wherein said at least one preliminarily built data base reflects relationship between values of said two parameters BER and IR and at least one additional parameter.

6. The method according to claim 1, wherein said one or more characteristics are selected from the following non-exhaustive list comprising: a number of data channels in the main signal to be analyzed, presence of a data signal in a particular communication channel of the main signal to be analyzed, quality of said data signal within the main signal to be analyzed.

7. The method according to claim 6, wherein the main signal to be analyzed is one component signal conveyed via a particular communication channel, and the method is suitable for detecting presence of a main data signal in said particular communication channel and/or quality of the main data signal, wherein in the method
the main data signal has a first bit rate,
said independent data signal has a second bit rate.

8. The method according to claim 7, for detecting presence of the main data signal based at least on the changes of the BER parameter in comparison with a reference value of the BER parameter in the analyzing circuit corresponding to absence of the main data signal in the interfering signal.

9. The method according to claim 8, further comprising a preliminary step of calibrating the analyzing circuit by measuring the reference value of the BER parameter at the absence of the main data signal in the interfering signal and at a particular reading of an IR parameter being a ratio between values of the independent data signal and the interfering signal.

10. The method according to claim 7, wherein the step of judging comprises using a preliminarily built database reflecting relationship between the parameters BER, IR and an additional parameter characterizing quality of the main data signal.

11. The method according to claim 10, wherein the additional parameter characterizing quality of the main data signal is its extinction ratio (ER) parameter.

12. The method according to claim 6, for estimating a number of data channels in the main signal, wherein said main signal is composed from a plurality of component signals respectively carried by a plurality of communication channels possibly carrying respective data signals; the step of judging comprises using a preliminarily built data base reflecting relationship between the parameters BER, IR, and an additional parameter being a number of data channels in the main signal.

13. The method according to claim 1, wherein said communication link is an optical communication link.

14. The method according to claim 6, comprising detecting a fact of existing more than one data channels in the main signal; the method further includes a step of adjusting said main signal to comprise only a single component signal transmitted via a single predetermined communication channel.

15. The method according to claim 14, wherein the main signal is an output signal of a filter or a dropped signal of an optical add drop multiplexer (OADM).

16. An apparatus for estimating at least one characteristics of a main signal to be analyzed, transmitted via a communication link, wherein said main signal is composed from one or more component signals possibly comprising respective data signals and transmitted via one or more respective communication channels, the apparatus comprising:

an analyzing circuit comprising a generator of an independent data signal for transmitting it in said circuit, and a BER tester for monitoring a BER (bit error rate) parameter associated with the independent data signal, the analyzing circuit being separate and independent from said communication link;

a coupling means for introducing at least a portion of energy of the main signal into the analyzing circuit as an interfering signal;

the apparatus enabling judgment about said one or more characteristics of the main signal based at least on changes in the monitored BER parameter.

17. The apparatus according to claim 16, further comprising a control and processing unit being in communication with the BER tester and being capable of performing said judgment.

18. The apparatus according to claim 16, further comprising a means for regulating and/or measuring a ratio between values of the independent data signal and the interfering signal, being called an interference ratio (IR) parameter;

said apparatus being capable of judging about at least one said transmission characteristics based on a combination of readings of said parameters obtained.

19. The apparatus according to claim 17, wherein the control and processing unit comprises a memory storing at least one preliminarily built database reflecting relationship between values of said two parameters BER and IR, and being capable of utilizing said at least one data base for the judgment.

20. The apparatus according to claim 19, wherein said at least one database reflects relationship between values of said two parameters BER and IR and at least one additional parameter.

21. The apparatus according to claim 20, wherein said one additional parameter is a number of data channels in the main signal.

22. The apparatus according to claim 20, wherein said one additional parameter is an extinction ratio ER of the main data signal.

23. The apparatus according to claim 17, wherein the control and processing unit is operative to ensure measurement of one of the two parameters BER or IR, while maintaining the other one of said two parameters constant; the control and processing unit thereby judging about at least one said transmission characteristics, based on the value of the parameter measured in said analyzing circuit.

24. The apparatus according to claim 16, adaptable for estimating said one or more characteristics selected from a non-exhausting list comprising: a number of data channels in the main signal, presence of a data signal in a particular communication channel of the main signal, quality of said data signal within the main signal.

25. The apparatus according to claim 24, adapted for estimating a number of data channels in the main signal, wherein said main signal is composed from a plurality of component signals respectively carried by a plurality of communication channels.

26. The apparatus according to claim 25, capable of monitoring the main signal and producing an indication whenever more than one data channels are detected in the main signal; the apparatus is further provided with a feedback circuit for further adjusting said main signal, in response to said indication.

27. The apparatus according to claim 26, wherein the main signal is either an output signal of a filter or a dropped signal of an optical add drop multiplexer (OADM).

28. The apparatus according to claim 27, adapted for detecting presence of a main data signal transmitted via a particular communication channel.

29. The apparatus according to claim 24, adapted for determining quality of the main data signal.

30. The apparatus according to claim 16, constituting part of a network node, pre-manufactured to be activated whenever required.

31. The apparatus according to 16, being adapted for analyzing optical signals, wherein said analyzing circuit is an optical analyzing circuit.

32. A system for estimating characteristics of one or more signals transmitted via one or more communication links, comprising at least one apparatus according to claim 16.

33. An apparatus for estimating one or more characteristics of a main signal to be analyzed, transmitted along a communication link, wherein said main signal possibly comprises at least one high bit rate data signal transmitted at a first bit rate, the apparatus comprising:

an analyzing circuit comprising a generator of an independent data signal at second bit rate for transmitting it in said circuit, and a BER tester for monitoring a BER (bit error rate) parameter associated with the independent data signal, the analyzing circuit being separate and independent from said communication link, while said second bit rate being lower than said first bit rate;

a coupling means for introducing at least a portion of energy of the main signal into the analyzing circuit as an interfering signal;

the apparatus enabling judgment about said one or more characteristics of the at least one high bit rate data signal, based at least on changes in the monitored BER parameter of the lower bit rate independent data signal, thereby reducing complexity and cost of the analysis of said main signal transmitted via the communication link.

34. A method for estimating one or more characteristics of a main signal to be analyzed, being transmitted along a communication link, wherein said main signal possibly comprising at least one high bit rate data signal transmitted at a first bit rate, the method comprises:

providing an analyzing circuit being separate and independent from said communication link, transmitting in the analyzing circuit an independent data signal having a second bit rate being lower than the first bit rate;

monitoring a bit error rate (BER) parameter associated with the independent data signal;

introducing into said analyzing circuit at least a portion of energy of the main signal derived from a particular point of said communication link, as an interfering signal;

judging about said one or more characteristics of said at least one high bit rate data signal at said particular point of the communication link, based at least on changes in the monitored BER parameter of the lower bit rate independent data signal, thereby reducing complexity and cost of the analysis of said main signal.

* * * * *